(12) United States Patent
Locher et al.

(10) Patent No.: US 11,117,587 B2
(45) Date of Patent: Sep. 14, 2021

(54) METHOD FOR OPERATING A VEHICLE DRIVE TRAIN

(71) Applicant: ZF Friedrichshafen AG, Friedrichshafen (DE)

(72) Inventors: Karl Locher, Pfronstetten-Tigerfeld (DE); Ahmet Macar, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/462,002

(22) PCT Filed: Oct. 25, 2017

(86) PCT No.: PCT/EP2017/077218
§ 371 (c)(1),
(2) Date: May 17, 2019

(87) PCT Pub. No.: WO2018/095678
PCT Pub. Date: May 31, 2018

(65) Prior Publication Data
US 2019/0322278 A1    Oct. 24, 2019

(30) Foreign Application Priority Data

Nov. 23, 2016    (DE) .................... 10 2016 223 177.4

(51) Int. Cl.
*B60W 30/186*    (2012.01)
*B60K 17/35*    (2006.01)
(Continued)

(52) U.S. Cl.
CPC .......... *B60W 30/186* (2013.01); *B60K 17/35* (2013.01); *B60K 23/0808* (2013.01);
(Continued)

(58) Field of Classification Search
CPC .......... B60W 30/186; B60W 2300/18; B60W 2510/0291; B60W 2510/1005;
(Continued)

(56) References Cited

U.S. PATENT DOCUMENTS 3,851,723 A * 12/1974 Pagdin ................ B60K 28/00
180/233
6,580,994 B2 * 6/2003 Katayama ........... B60K 28/165
701/69

(Continued)

FOREIGN PATENT DOCUMENTS

DE        10033647 A1    1/2002
DE    102008043963 A1    5/2010
(Continued)

OTHER PUBLICATIONS

English translation of DE10033647A1; http://translationportal.epo.org; Jun. 11, 2020 (Year: 2020).*

(Continued)

*Primary Examiner* — Roger L Pang
(74) *Attorney, Agent, or Firm* — Dority & Manning, P.A.

(57) ABSTRACT

The invention relates to a method for operating a vehicle drive train (1) comprising a prime mover (2), comprising a transmission (3), and comprising a driven end (4). A friction-locking shift element (10) is provided, the power transmission capacity of which is variable and, with the aid of which, at least a portion of the torque transmitted in the vehicle drive train (1) can be transmitted between a transmission output shaft (8) and an area (6) of the driven end (4). One shift-element half is operatively connected to the transmission output shaft (8) and the other shift-element half is operatively connected to the area (6) of the driven end (4). The rotational speed of the transmission output shaft (8) is determined as a function of the rotational speed in the area (6) of the driven end (4) and also as a function of the
(Continued)

rotational speed of the prime mover (2) and the ratio currently engaged in the area of the transmission (3). In the event of a deviation between the rotational speed of the transmission output shaft (8) determined on the output end and the rotational speed of the transmission output shaft (8) determined on the transmission-input end, which is greater than or equal to a threshold value and/or an operating temperature in the area of the friction-locking shift element (10), which is greater than or equal to a limiting value, measures reducing loads of the friction-locking shift element (10) are initiated.

11 Claims, 4 Drawing Sheets (51) Int. Cl.
  *B60K 23/08* (2006.01)
  *B60K 23/04* (2006.01)
  *F16D 48/06* (2006.01)
  *B60W 10/06* (2006.01)

(52) U.S. Cl.
  CPC .............. *B60K 2023/046* (2013.01); *B60K 2023/0825* (2013.01); *B60W 10/06* (2013.01); *B60W 2300/18* (2013.01); *B60W 2510/0291* (2013.01); *B60W 2510/104* (2013.01); *B60W 2510/1005* (2013.01); *B60W 2510/12* (2013.01); *B60W 2710/02* (2013.01); *F16D 48/06* (2013.01); *F16D 2500/1045* (2013.01); *F16D 2500/10431* (2013.01); *F16D 2500/30404* (2013.01); *F16D 2500/30825* (2013.01)

(58) Field of Classification Search
  CPC ....... B60W 2510/104; B60W 2510/12; B60W 2710/02; B60W 2050/0292; B60W 2510/1015; B60W 2520/28; B60W 2710/027; B60W 2710/0666; B60W 10/119; B60W 50/0205; B60W 50/029; B60W 50/038; B60W 10/06; F16D 2500/5106; F16D 2500/30806; F16D 2500/3067; F16D 2500/30825; F16D 2500/30404; F16D 2500/1045; F16D 2500/10431; F16D 48/06; B60K 17/35; B60K 23/0808; B60K 2023/046; B60K 2023/0825; Y10T 477/6424; Y10T 477/653
  USPC ............................................... 701/54, 57, 66
  See application file for complete search history.

(56) References Cited

U.S. PATENT DOCUMENTS

| 2005/0177294 | A1* | 8/2005 | Jiang ................ F16D 48/066 701/67 |
| 2010/0130328 | A1 | 5/2010 | Eberhard et al. |
| 2015/0183429 | A1* | 7/2015 | Shiozawa ......... B60W 50/0098 701/48 |
| 2018/0029472 | A1* | 2/2018 | Yoshida ................ B60K 17/35 |
| 2019/0077257 | A1* | 3/2019 | Kondo .............. B60K 23/0808 |
| 2019/0218983 | A1* | 7/2019 | Northrup ................ F16D 13/52 |

FOREIGN PATENT DOCUMENTS

| DE | 102009032265 A1 | 1/2011 |
| DE | 102014007235 A1 | 11/2014 |

OTHER PUBLICATIONS

International Search Report (English Translation) PCT/EP2017/077218, dated Jan. 15, 2018. (2 pages).

* cited by examiner

METHOD FOR OPERATING A VEHICLE DRIVE TRAIN

FIELD OF THE INVENTION

The invention relates generally to a method for operating a vehicle drive train.

BACKGROUND

In known vehicle drive trains, which include a prime mover, a transmission, and a driven end, friction work introduced in the area of so-called "all-wheel clutches" is determined primarily on the basis of rotational speeds of wheels of the drivable vehicle axles.

In this case, there is the possibility that the inner disk carrier of the all-wheel clutch is coupled to a drivable vehicle axle designed as a vehicle front axle and the outer disk carrier of the all-wheel clutch is operatively connected to a transmission output shaft of the transmission as well as to the likewise drivable vehicle rear axle. The rotational speeds determined in the area of the wheels of the drivable vehicle front axle and the drivable vehicle rear axle are utilized for determining the rotational speeds of the inner disk carrier and the outer disk carrier.

In the case of an interruption of a force-fit connection in the power path between the transmission output shaft and the vehicle rear axle, which arises, for example, due to a failure of the drive shaft extending between the transmission output shaft and the rear axle or a failure of a lateral rear axle shaft between the transverse transfer gearbox of the vehicle rear axle and one of the wheels of the vehicle rear axle, the transmission output torque is no longer supportable in the area of the vehicle rear axle, and so the complete transmission output torque is present in the area of the all-wheel clutch. During operating condition progressions of an above-described vehicle drive train, during which the transmission output torque is greater than the all-wheel torque output by a vehicle dynamics controller or the maximum torque which can be transmitted by the all-wheel clutch, the rotational speed of the outer disk carrier increases due to the interruption of a force-fit connection. This increase, in turn, results in an increase of the differential speed in the area of the all-wheel clutch between the outer disk carrier and the inner disk carrier, which, in connection with the applied torque, results in a corresponding introduction of friction work into the all-wheel clutch.

Disadvantageously, during such operating condition progressions, the increase of the rotational speed of the outer disk carrier is not detected via the calculation of the rotational speed of the outer disk carrier on the basis of the wheel speeds in the area of the rear axle and/or in the area of the front axle, and so an activation of a protective function for the all-wheel clutch does not take place and the increased power input into the all-wheel clutch causes overheating and, possibly, irreversible damage to the all-wheel clutch. In the case of a common oil supply of the all-wheel clutch and the transmission, such adverse effects on the function of an all-wheel clutch may possibly result in a total failure of the transmission, with correspondingly high repair costs, since contaminations of the transmission oil resulting from the damage to the all-wheel clutch then impairs the function of the transmission control unit.

If the all-wheel clutch is disengaged in the event of a detected interruption of a force-fit connection in the area of the rear axle, this results in the vehicle immediately coming to a standstill, which is undesirable, however.

Moreover, it is also possible that, in the event of a failure of a vehicle axle which extends in the transverse direction of the vehicle and transmits torque between the transverse transfer gearbox or the axle transmission and a wheel of the associated drivable vehicle axle, torque is applied, to an impermissible extent, to a friction-locking shift element which is arranged in the area of a transverse transfer gearbox and is operated as an interwheel differential lock which can be controlled by an open-loop system, and is possibly damaged.

A method for protecting an all-wheel clutch is known from DE 10 2009 032 265 A1, in which a thermal load level of the all-wheel clutch is determined as a function of wheel speed sensor signals, wherein substitute values are utilized in the event that individual sensors fail.

SUMMARY OF THE INVENTION

Example aspects of the present invention provide a method for operating a vehicle drive train that includes a prime mover, a transmission, and a driven end, as well as a friction-locking shift element, with the aid of which overloads in the area of the friction-locking shift element are avoidable in a simple way while simultaneously ensuring high vehicle availability.

In the method according to examples aspects of the invention, a vehicle drive train includes a prime mover, a transmission, as well as a friction-locking shift element. The power transmission capacity of the friction-locking shift element is variable, and at least a portion of the torque transmitted in the vehicle drive train is transmittable between a transmission output shaft, which is connected to a primary axle of the vehicle in a driving manner, and a secondary axle of the vehicle with the aid of the friction-locking shift element. One shift-element half of the friction-locking shift element is operatively connected to the transmission output shaft and the other shift-element half of the friction-locking shift element is operatively connected to the secondary axle. The rotational speed of the transmission output shaft is determined both as a function of the rotational speed of the primary axle and as a function of a rotational speed of the transmission input shaft and a ratio currently engaged in the area of the transmission.

When the rotational speed of the transmission output shaft determined as a function of the rotational speed of the primary axle and the rotational speed of the transmission output shaft determined as a function of the rotational speed of the transmission input shaft deviate from one another by more than a threshold value and/or when an operating temperature in the area of the friction-locking shift element exceeds a limiting value, measures for reducing the loads of the friction-locking shift element are initiated.

With the aid of the approach according to the invention, a differential speed in the area of the friction-locking shift element is determined with little outlay, as a function of which an interruption of a force-fit connection, such as a shaft breakage, may be determined in a simple way. On the basis of this knowledge and/or in the event of impermissibly high operating temperatures in the area of the shift element, measures may therefore be initiated, with a high level of spontaneity, which prevent irreversible damage in the area of the friction-locking shift element, with little structural outlay, and an adverse effect on a vehicle availability may be avoided to a desired extent.

In order to be able to avoid erroneous detections in a simple way, in one advantageous variant of the method according to the invention, upon detection of a differential speed between the rotational speed of the transmission output shaft determined on the output end and the rotational speed of the transmission output shaft determined on the transmission-input end, which is greater than or equal to the threshold value, a time monitoring is started first of all, wherein the measures reducing the loads of the friction-locking shift element are initiated only when the differential speed is above the threshold value for longer than a pre-defined or applicable time period.

In one further advantageous variant of the method according to the invention, measures reducing the loads of the friction-locking shift element are initiated already before the predefined or applicable time period lapses when the operating temperature is greater than or equal to the limiting value of the operating temperature during the time monitoring. Therefore, in turn, the situation is avoided in which the preferably applicable waiting time provided for avoiding erroneous detections upon occurrence of impermissibly high operating temperatures facilitates damage in the area of the friction-locking shift element.

If the time monitoring is reset when the threshold value is fallen below, the defined or applicable time period provided for avoiding erroneous detections is fully available once again if the differential speed between the shift-element halves of the friction-locking shift element is exceeded once again, or a wait ensues, to a desirable extent, until the measures reducing the load of the friction-locking shift element are initiated.

If a further time monitoring is started when the threshold value and the limiting value are fallen below, and if measures reducing the loads of the friction-locking shift element are terminated when the differential speed is less than the threshold value for longer than a further defined time period and the operating temperature of the friction-locking shift element is less than or equal to a further limiting value, impairments of a conventional operation possibly resulting from the measures reducing the loads of the friction-locking shift element occur only for as long as necessary, and a vehicle operated to the extent according to example aspects of the invention is then available once again in a known way.

In one variant of the method according to the invention, which may be carried out with little outlay and results in low operating costs, the measures reducing the loads of the friction-locking shift element are terminated after an ignition changeover, without a visit to the workshop required therefor.

An ignition changeover is present when the ignition of the vehicle is switched on or switched off.

In one variant of the method according to the invention, which is likewise easily carried out and is implementable in existing vehicle systems with little outlay, the torque transmitted by the friction-locking shift element is varied in order to reduce the load of the friction-locking shift element depending on the operating condition, wherein, for example, the transmitted torque may be raised in order to reduce the slip present in the area of the friction-locking shift element or may be lowered in order to reduce the power input into the friction-locking shift element.

If the drive torque of the prime mover is reduced in order to reduce the loads of the friction-locking shift element, the power input into the friction-locking shift element may be reduced in a simple way without substantially adversely affecting the vehicle availability.

In further advantageous variants of the method according to the invention, in order to minimize the adverse effect on the handling characteristics which can be expected by a driver of the vehicle, the drive torque of the prime mover is reduced as a function of the operating temperature of the friction-locking shift element and/or as a function of the ratio currently engaged in the transmission. These approaches, in turn, are based on the knowledge that, as the operating temperature of the friction-locking shift element increases, the further power input into the friction-locking shift element is to be reduced by a greater extent than is the case at lower operating temperatures of the friction-locking shift element, and the torque present in the area of the friction-locking shift element increases as the ratio increases and, likewise, in turn, a higher power input into the friction-locking shift element takes place, which may then be reduced to the desired extent only by more greatly reducing the drive torque of the prime mover.

BRIEF DESCRIPTION OF THE DRAWINGS

Further advantages and advantageous embodiments of the subject matter of the invention result from the claims and the exemplary embodiment, the principle of which is described in the following with reference to the drawings.

Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
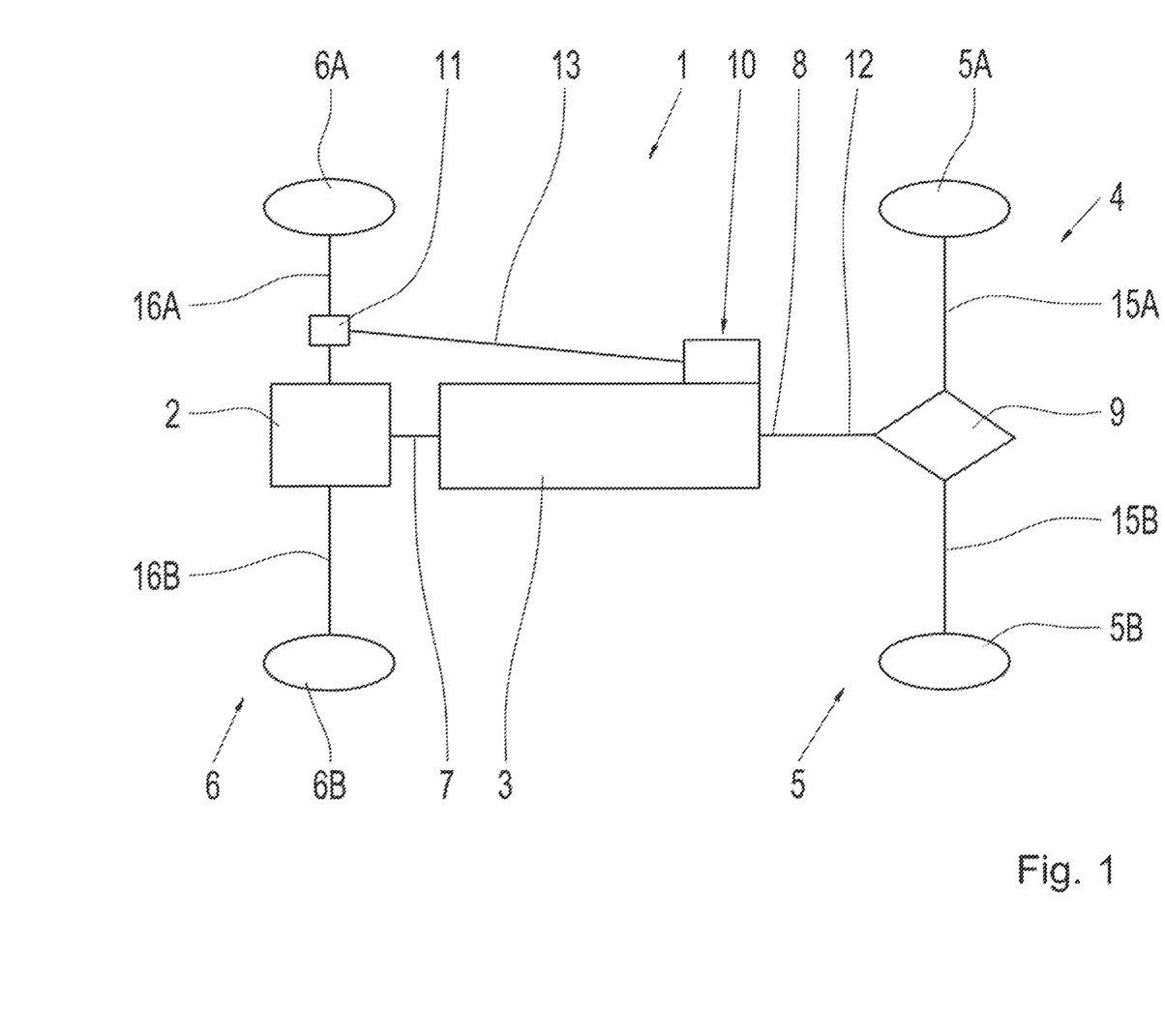
FIG. 1 shows a highly schematicized representation of a vehicle drive train comprising two drivable vehicle axles.

FIG. 1 shows a schematic of a vehicle drive train 1 that includes a prime mover 2, a transmission 3, and a driven end 4. The vehicle drive train 1 includes two drivable vehicle axles 5, 6 in this case. The vehicle axle 5 is the rear axle and the vehicle axle 6 is the front axle. It is at the discretion of a person skilled in the art, of course, to design the vehicle axle 5, depending on the particular present application, as the vehicle front axle and to design the vehicle axle 6 as the vehicle rear axle.

In the present case, multiple gear ratios for forward travel and at least one gear ratio for reverse operation may be implemented in the the transmission 3. Thus, the transmission 3 may be designed as a multi-ratio automatic transmission or as a continuously variable transmission. The prime mover 2 is operatively connected to the transmission 3 in the area of a transmission input shaft 7, while the transmission 3 is coupled to a transverse transfer gearbox 9 of the rear axle 5 via a transmission output shaft 8 and a cardan or drive shaft 12 operatively connected thereto. In addition, the prime mover 2 is operatively connectable to a transverse transfer gearbox 11 of the vehicle front axle 6 with the aid of a friction-locking shift element 10 which is also referred to as an all-wheel clutch in the following, in order to transmit the particular torque made available by the prime mover 2 in the direction of the drivable front axle 6 with degrees of distribution of 0% to 50%. The particular torque made available by the prime mover 2 is present in the area of the transmission output shaft 8 in an appropriately converted form depending on the ratio engaged or set in the area of the transmission 3. This means, depending on the particular power transmission capacity set in the area of the friction-locking shift element 10, the drive torque generated in the area of the prime mover 2 is further transmitted to an extent between 50% and 100% by the transmission output shaft 8 in the direction of the rear axle 5.

The transmission output shaft 8 is coupled to a shift-element half of the shift element 10, while the other shift-element half of the friction-locking shift element 10 is connected to a transverse transfer gearbox 11 of the front axle 6 via a shaft 13 extending essentially in the longitudinal direction of the vehicle. Wheel drive shafts 16A, 16B extend between the transverse transfer gearbox 11 and the wheels 6A, 6B, respectively, via which the torque present in the area of the transverse transfer gearbox 11 is transmitted further in the transverse direction of the vehicle, in the direction of the wheels 6A and 6B. Similarly, the torque transmitted to the transverse transfer gearbox 9 via the cardan shaft 12 is transmitted in the transverse direction of the vehicle to the wheels 5A, 5B of the rear axle 5 via the wheel drive shafts 15A, 15B, respectively, in order to be able to drive the vehicle, which includes the vehicle drive train 1, to the desired extent.

The rotational speeds of the wheels 5A, 5B and 6A, 6B of the rear axle 5 and of the front axle 6, respectively, are determined by taking measurements with the aid of speed sensors in the area of the wheels 5A to 6B, wherein the rotational speed of the transmission output shaft 8 is calculated, in this case, on the basis of the rotational speeds of the rear axle 5 determined in the area of the wheels 5A and 5B as well as a ratio of the transverse transfer gearbox 9. A mean rotational speed is determined from the rotational speeds of the wheels 5A and 5B, on the basis of which the rotational speed of the transmission output shaft 8 is determined.

Figure 2:
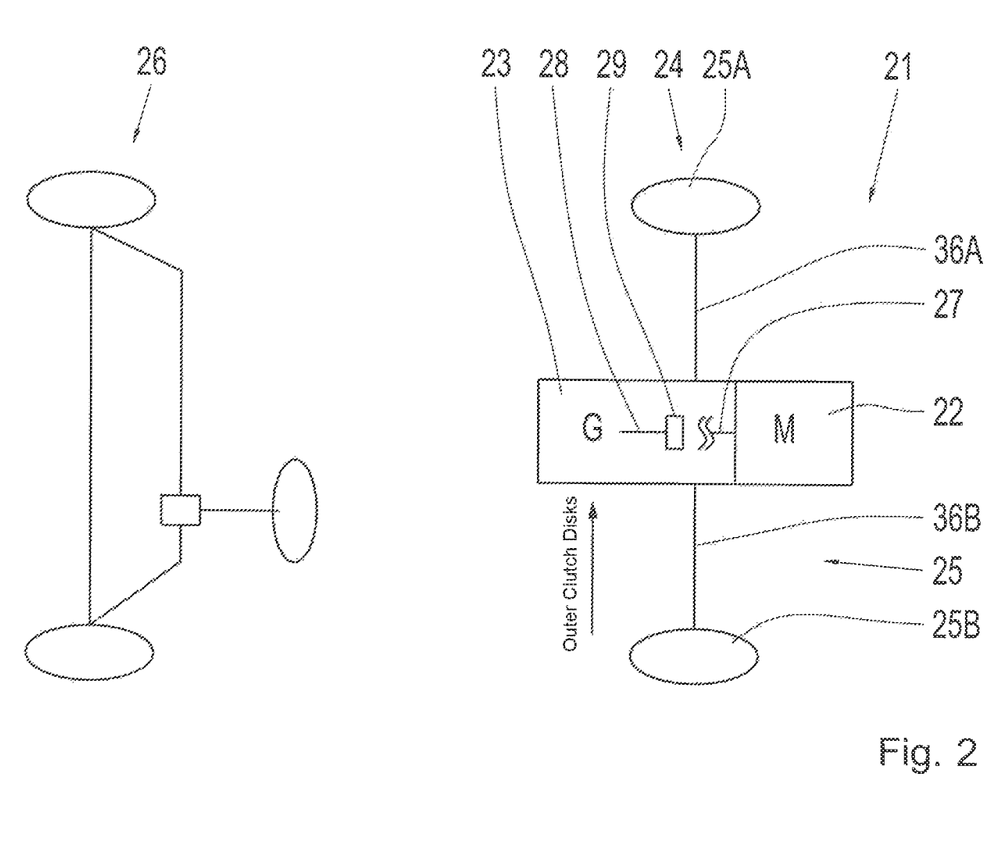
FIG. 2 shows a schematic of a further vehicle drive train of a rear-driven vehicle.

FIG. 2 shows a further embodiment of a vehicle drive train 21 which likewise includes a prime mover 22, a transmission 23, and a driven end 24. In contrast to the vehicle drive train 1, the driven end 24 includes only one drivable vehicle axle 25 which represents the rear axle. A further vehicle axle 26, which is the front axle in the exemplary embodiment presently under consideration, is not drivable with the aid of the prime mover 22, although it is designed to be steerable to the same extent as the front axle 6 of the vehicle drive train 1.

Figure 3:
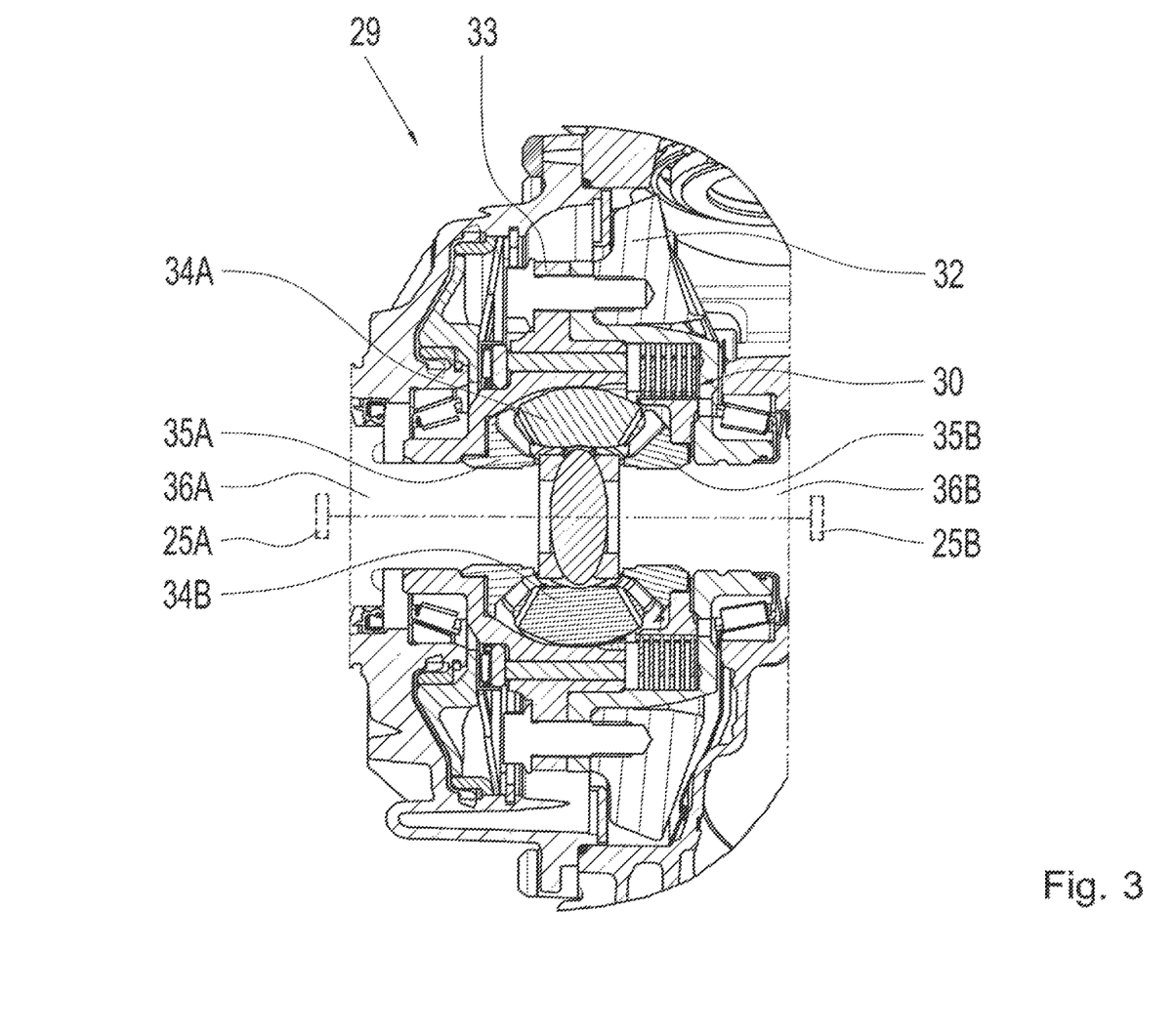
FIG. 3 shows a cross-sectional view of a transverse transfer gearbox arranged in the area of the drivable vehicle axle of the vehicle drive train according to FIG. 2.

A transverse transfer gearbox 29, which is shown in greater detail in FIG. 3, is provided in the area of the rear axle 25 and is operatively connected to a transmission output shaft 27 of the transmission 23 in the area of a ring gear or gearwheel 32. The gearwheel 32 or the ring gear of the transverse transfer gearbox 29 is rotationally fixed to a differential cage 33, to which differential pinions 34A, 34B are rotationally fixed. Differential pinions 34A, 34B are intermeshed with bevel gears 35A, 35B, respectively, which, in turn, are rotationally fixed to wheel drive shafts 36A, 36B, respectively, extending in the transverse direction of the vehicle. The wheel drive shafts 36A and 36B extend in the transverse direction of the vehicle between the transverse transfer gearbox 29 and the wheels 25A, 25B, respectively, of the rear axle 25. A friction-locking shift element 30 is arranged between the ring gear 32 and the wheel drive shaft 36B, with the aid of which the ring gear 32 is rotationally fixable to the wheel drive shaft 36B.

The friction-locking shift element 30 is an interwheel differential lock controlled by a closed-loop system in this case, with the aid of which the compensating function of the transverse transfer gearbox 29 including a differential gear is continuously reducible until the rear axle 25 has the function of a rigid axle and the wheels 25A and 25B revolve at the same rotational speed.

The rotational speeds of the wheels 25A and 25B are determined, in this case, by taking measurements with the aid of wheel sensors arranged in the area of the wheels 25A and 25B in a way known per se and, inter alia, are utilized for determining the rotational speed of the transmission output shaft 28 operatively connected to the transverse transfer gearbox 29.

In the event of a breakage in the area of the cardan shaft 12 as well as in the area of the wheel drive shaft 15A or 15B, the torque present at the transmission output shaft 8 is no longer supportable in the area of the wheels 5A and 5B of the vehicle drive train 1. In the event of such an operational failure, the total drive torque made available by the prime mover 2, multiplied by the ratio presently engaged in the transmission 3, is then present at the shift-element half of the friction-locking shift element 10 operatively connected to the transmission output shaft 8.

Since, for reasons related to installation space and costs, the friction-locking shift element 10 is not designed to be capable of permanently and completely transmitting a high torque, which is present when a ratio has been appropriately engaged in the transmission 3, in the direction of the front axle 6, and the above-described operational failure cannot be detected in the area of the vehicle drive train 1 with the aid of the determination, at the wheel or on the output end, of the rotational speed of the transmission output shaft 8, the friction-locking shift element 10 may experience an undesirably high power input as the operating time increases, which may cause irreversible damage in the area of the friction-locking shift element 10.

Irreversible damage may also occur in the area of the friction-locking shift element 30 of the transverse transfer gearbox 29 when the wheel drive shaft 36A or the wheel drive shaft 36B breaks and the torque of the transmission output shaft 28 of the transmission 23 present at the ring gear 32 is no longer supportable in the area of the wheels 25A and 25B of the rear axle 25 in a way known per se when the friction-locking shift element 30 is engaged. In order to avoid such an operating condition in the case of the latter-described operational failure in the area of the vehicle drive train 24, the power transmission capacity of the friction-locking shift element 30 is increased and the torque introduced by the transmission output shaft 28 into the transverse transfer gearbox 29 is transmitted in the direction of the wheel 25A or 25B via the still fully functional wheel drive shaft 36A or 36B, respectively.

Since the friction-locking shift element 30 of the transverse transfer gearbox 29 is also designed having only a limited power transmission capacity, due to economic aspects and in order to limit an installation space requirement of the transverse transfer gearbox 29, it is possible, provided there is an appropriately high available tractive force, that irreversible damage occurs in the area of the friction-locking shift element 30 as the operating time increases. This is facilitated during such an operational failure in the area of the wheel input shaft 36A or 36B, since the operational failure is not detectable with the aid of the determination of the rotational speed of the transmission output shaft 8 on the output end.

Due to the torque which is impermissibly high in the event of a failure and is present at the friction-locking shift element 10 or 30 via the transmission output shaft 8 or 28, respectively, the friction-locking shift element 10 or 30 is operated in a slip condition. This continuous slip operation brings about a possibly impermissible increase of the operating temperature in the area of the friction-locking shift element 10 or 30 as the operating time increases. In order to avoid damage in the area of the friction-locking shift element 10 or 30 and simultaneously minimize the adverse effect on an availability of a vehicle designed to include the vehicle drive train 1 or 21, the approach described in greater detail in the following with reference to the vehicle drive train 1 is provided, during which, in addition to the determination of the rotational speed of the transmission output shaft 8 on the output end, the rotational speed of the transmission output shaft 8 is also determined as a function of the rotational speed of the transmission input shaft 7 multiplied by the ratio currently engaged in the transmission 3. Thereafter, the rotational speed of the transmission output shaft 8 determined on the output end is compared to the rotational speed of the transmission output shaft 8 determined on the transmission-input end.

In the presence of a differential speed $\Delta n8$ between the rotational speed on the output end and the rotational speed of the transmission output shaft 8 on the transmission-input end which is greater than a threshold value, an operational failure in the power flow between the transmission output shaft 8 and the wheels 5A, 5B is detected. The differential speed $\Delta n8$ may be determined as a function of the rotational speed of the transmission output shaft 8 determined in the area of the wheels 5A, 5B on the output end and as a function of the rotational speed of the transmission output shaft 8 determined on the transmission-input end. The rotational speed of the transmission input shaft may be determined with the aid of a transmission input shaft sensor or even with the aid of an engine speed sensor.

Figure 4:
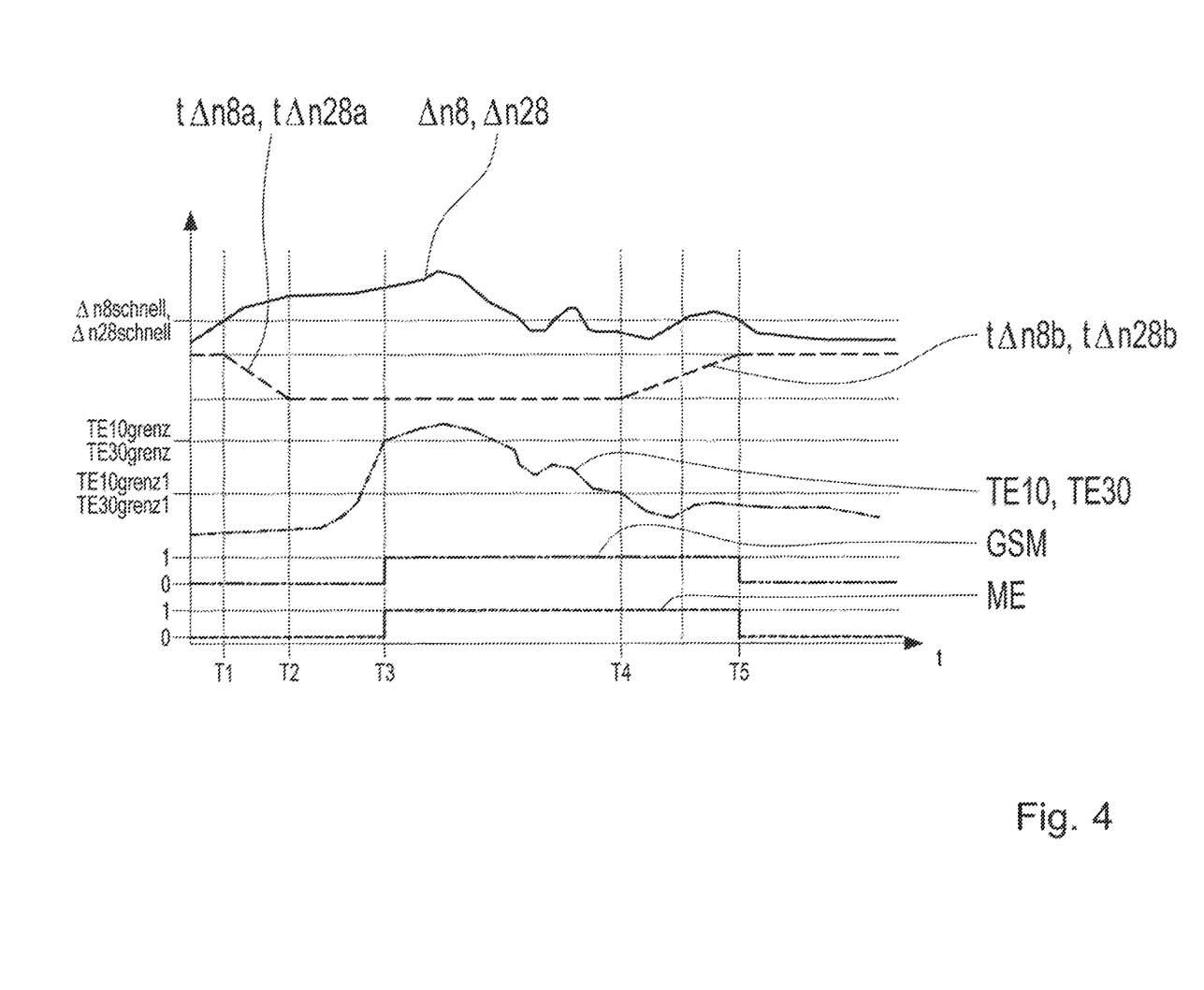
FIG. 4 shows curves of various operating condition parameters of the vehicle drive train according to FIG. 1 and FIG. 2 over the operating time t.

During the operating condition progression of the vehicle drive train 1, which forms the basis for the curves of various operating conditions of the vehicle drive train 1 shown in FIG. 4, an aforementioned operational failure is detected at a point in time T1. Since the differential speed $\Delta n8$ exceeds the threshold value $\Delta n8$schnell at the point in time T1, a time monitoring t$\Delta n8a$ is started first of all, and a check is carried out up to a point in time T2 to determine whether the differential speed $\Delta n8$ is greater than the threshold value $\Delta n8$schwell during a predefined time period.

This requirement is met at the point in time T2. An operating temperature TE10 of the friction-locking shift element 10 is less than a limiting value TE10grenz at the point in time T2, which is why the vehicle drive train 1 continues to be operated to the demanded extent. As the operating time t increases, the operating temperature TE10 of the friction-locking shift element 10 increases and reaches the limiting value TE10grenz at a point in time T3. This causes a transmission protection function to be activated, the activation condition of which is graphically depicted in FIG. 4 with the aid of the curve GSM. At the point in time T3, the curve GSM jumps from the activation value 0 to the activation value 1. In addition, a curve ME also switches from the condition value 0 to the condition value 1, which, in turn, triggers an engine override and brings about an associated limitation of the drive torque of the prime mover 2 to an applicable torque value, at which the power input into the friction-locking shift element 10 is limited in such a way that permanent damage of the friction-locking shift element 10 is reliably avoided. Due to the limitation of the torque of the prime mover 2, the differential speed $\Delta n8$ as well as the operating temperature TE10 have the curves represented starting at the point in time T3.

At a further point in time T4, the operating temperature TE10 reaches a further limiting value TE10grenz1. Due to this event, a further time monitoring t$\Delta n8b$ is started and monitoring is carried out to determine whether the operating temperature TE10 remains below the further limiting value TE10grenz1 for a further predefined time period which ends at a point in time T5 in this case. Since this test criterion is met at the point in time T5 in this case, the transmission protection mode GSM is terminated, whereby the curve GSM jumps from the activation value 1 to the activation value 0. Simultaneously, the engine override is also terminated at the point in time T5, which is why the curve ME is also returned from condition value 1 to condition value 0.

The above-described approach for limiting the power input into the friction-locking shift element 10 or the all-wheel clutch may be utilized to the same extent for limiting the power input into the friction-locking shift element 30 of the transverse transfer gearbox 29. Therefore, a differential speed $\Delta n28$ in the area of the friction-locking shift element 30 between the rotational speed of the transmission output shaft 28 determined on the output end as a function of the wheel speeds determined in the area of the wheels 25A, 25B and the rotational speed of the transmission output shaft 28 determined on the transmission-input end as a function of the transmission input shaft 27 and the ratio engaged in the area of the transmission 23 is calculated. If the differential speed $\Delta n28$ exceeds a threshold value $\Delta n28$schwell, the time monitoring t$\Delta n28a$ is started to the above-described extent at the point in time T1 and a check is carried out to determine whether the differential speed $\Delta n28$ is above the limiting value $\Delta n28$schwell for an applicable time period. If the result of the check is positive, an additional check is carried out to determine whether the operating temperature TE30 of the friction-locking shift element 30 is above a limiting value TE30grenz. If this precondition is also met, the transmission protection mode GSM is activated and, simultaneously, an engine override is carried out in order to limit the drive torque made available by the prime mover 22 to an applicable value at which impermissible loads of the friction-locking shift element 30 are avoided.

The transmission protection mode GSM and the engine override triggered therewith are likewise canceled or deactivated to the above-described extent when the operating temperature TE30 of the friction-locking shift element 30 exceeds a further limiting value TE30grenz1 for an applicable time period which may be monitored with the aid of a further time monitoring t$\Delta n28b$. This is the case at the point in time T5.

It is also possible to mask out the plausibility check of the differential speed $\Delta n8$, $\Delta n28$ during defined driving situations, for example, in a "neutral" operating condition of the transmission 3, 23, during which the power flow in the area of the transmission 3, 23 is interrupted, in order to avoid an erroneous detection of the differential speed $\Delta n8$, $\Delta n28$.

Moreover, in the event of a detected operational failure, it is possible to make a fault entry in the transmission control unit and provide a warning message in the vehicle instrument cluster in addition to the above-described transmission protection measures, in order to inform a driver about the operational failure and allow for an actuation of the all-wheel clutch with a predefined torque.

In general, it is also possible to transfer the friction-locking shift element into a completely disengaged operating condition upon detection of impermissibly high loads, preferably thermal loads.

Modifications and variations can be made to the embodiments illustrated or described herein without departing from the scope and spirit of the invention.

REFERENCE CHARACTERS 1 vehicle drive train
2 prime mover
3 transmission
4 driven end
5 vehicle axle, rear axle
5A, B wheel
6 vehicle axle, front axle
6A, B wheel
7 transmission input shaft
8 transmission output shaft
9 transverse transfer gearbox
10 friction-locking shift element
11 transverse transfer gearbox
12 cardan shaft
13 shaft
15A, B wheel drive shaft
16A, B wheel drive shaft
21 vehicle drive train
22 prime mover
23 transmission
24 driven end
25 vehicle axle, rear axle
25A, B wheel
26 vehicle axle, front axle
27 transmission input shaft
28 transmission output shaft
29 transverse transfer gearbox
30 friction-locking shift element
32 gearwheel, ring gear
33 differential cage
34A, B differential pinions
35A, B bevel gear
36A, B wheel drive shaft
Δn8 differential speed
Δn8schwell threshold value
tΔn8a, b time monitoring
Δn28 differential speed
Δn28_schwell threshold value
tΔn28a, b time monitoring
T1 to T5 discrete point in time
t operating time
TE10, TE30 operating temperature
TE10grenz, TE30grenz threshold value
TE10grenz1, TE30grenz1 further threshold value
GSM transmission protection mode
ME engine override

The invention claimed is:

1. A method for operating a vehicle drive train (1) that comprises a prime mover (2), a transmission (3) and a friction-locking shift element (10), a power transmission capacity of the friction-locking shift element (10) is variable, at least a portion of a torque transmitted in the vehicle drive train (1) is transmittable between a transmission output shaft (8) and a secondary axle (6) of the vehicle via the friction-locking shift element (10), the transmission output shaft (8) is connected to a primary axle (5) of the vehicle in a driving manner, one shift-element half of the friction-locking shift element (10) is operatively connected to the transmission output shaft (8), and the other shift-element half of the friction-locking shift element (10) is operatively connected to the secondary axle (6), the method comprising:

determining a rotational speed of the transmission output shaft (8) both as a function of the rotational speed of the primary axle (5) and as a function of a rotational speed of a transmission input shaft (7) and a gear ratio currently engaged in the transmission (3); and initiating load reducing measures of the friction-locking shift element (10) when the rotational speed of the transmission output shaft (8) determined as the function of the rotational speed of the primary axle (5) and the rotational speed of the transmission output shaft (8) determined as the function of the rotational speed of the transmission input shaft (7) deviate from each other by more than a threshold value (Δn8schwell).

2. The method of claim 1, further comprising starting a time monitoring (tΔn8a) when a differential speed (Δn8) between the rotational speed of the transmission output shaft (8) determined as the function of the rotational speed of the primary axle (5) and the rotational speed of the transmission output shaft (8) determined as the function of the rotational speed of the transmission input shaft is greater than or equal to the threshold value (Δn8schwell), wherein the load reducing measures of the friction-locking shift element (10) are initiated only when the differential speed (Δn8) is greater than or equal to the threshold value (Δn8schwell) for longer than a predefined time period.

3. The method of claim 2, wherein the load reducing measures of the friction-locking shift element (10) are already initiated before the predefined time period lapses when an operating temperature (TE10) of the friction-locking shift element (10) is greater than or equal to a limiting value (TE10grenz) during the time monitoring (tΔn8a).

4. The method of claim 2, further comprising resetting the time monitoring (tΔn8) when the differential speed (Δn8) falls below the threshold value (Δn8schwell).

5. The method of claim 2, further comprising:

starting a further time monitoring (tΔn8b) when the differential speed (Δn8) falls below the threshold value (Δn8schwell) and an operating temperature (TE10) of the friction-locking shift element (10) falls below a limiting value (TE10grenz); and terminating the load reducing measures of the friction-locking shift element (10) when the differential speed (Δn8) is less than the threshold value (Δn8schwell) for longer than a further defined time period and the operating temperature (TE10) of the friction-locking shift element (10) is less than or equal to a further limiting value (TE10grenz1).

6. The method of claim 1, further comprising terminating the load reducing measures of the friction-locking shift element (10) after an ignition changeover.

7. The method of claim 1, wherein the load reducing measures comprise varying the torque transmitted by the friction-locking shift element (10).

8. The method of claim 1, wherein the load reducing measures comprise reducing a drive torque of the prime mover (2).

9. The method of claim 8, wherein the drive torque of the prime mover (2) is reduced as a function of an operating temperature (TE10) of the friction-locking shift element (10), the gear ratio currently engaged in the transmission (10), or both the operating temperature (TE10) of the friction-locking shift element (10) and the gear ratio currently engaged in the transmission (10).

10. The method of claim 1, wherein the rotational speed of the primary axle (5) is determined as a mean rotational speed of the rotational speeds of a left wheel (5A) and a right wheel (5B).

11. The method of claim 1, wherein initiating the load reducing measures of the friction-locking shift element (10) comprises initiating the load reducing measures of the friction-locking shift element (10) when both of the following conditions occur:
- the rotational speed of the transmission output shaft (8) determined as the function of the rotational speed of the primary axle (5) and the rotational speed of the transmission output shaft (8) determined as the function of the rotational speed of the transmission input shaft (7) deviate from each other by more than the threshold value ($\Delta n8schwell$); and
- an operating temperature (TE10) of the friction-locking shift element (10) exceeds a limiting value (TE10grenz).

* * * * *